UNITED STATES PATENT OFFICE.

JOHN KOEBEL, OF MILWAUKEE, WISCONSIN.

ORNAMENTATION OF SHEET METAL.

SPECIFICATION forming part of Letters Patent No. 381,390, dated April 17, 1888.

Application filed October 29, 1887. Serial No. 253,708. (No specimens.)

*To all whom it may concern:*

Be it known that I, JOHN KOEBEL, of Milwaukee, in the county of Milwaukee, and in the State of Wisconsin, have invented certain new and useful Improvements in the Ornamentation of Sheet Metal; and I do hereby declare that the following is a full, clear, and exact description thereof.

My invention relates to the ornamentation of sheet metal, having especial reference to what is known in the trade as "sheet-tin," and will be fully set forth hereinafter.

"Sheet-tin," so called, consists of thin sheets of iron covered on both sides with a coating of tin, and is largely used for the manufacture of domestic vessels and utensils grouped together under the general name of "tinware;" and the object of my present invention is the production of a colored crystallized appearance on one or both surfaces of said material. I may produce this ornamented surface in several ways; and first I will describe what I term the "cold method." I prepare a bath or solution by mixing together three parts cold water, two parts muriatic acid, one part nitric acid, and one-eighth part of bichromate of potash, and if I wish to ornament both sides of the sheet-tin I immerse a sheet of it in this mixture for a few seconds; but if I only wish to ornament one side then I coat or rub that side of the tin sheet (which must be perfectly clean) with the solution, applying it with a cloth or rag, and afterward immediately clean the coated surface (or surfaces) with clear water, and then pour clear muriatic acid over said entire surface, (or surfaces,) and next immediately coat the said surface (or surfaces) with my second solution, which is a mixture of about one part of hyposulphite of soda dissolved in twelve parts of water. I now leave this second coat on as long as I desire, until the colored crystallized effect is brought out, (usually a minute or less, the longer the time the darker the colors produced,) and then I clean said surface (or surfaces) with clear water, as before. The "hot method" is very similar, except that I first heat the sheet-tin until the tin begins to melt, and then sprinkle it with cold water or blow cold air on it until the sheet is cooled enough to handle, and then the hereinbefore first-described process is carried out, the effect of the sprinkling with water or blowing with cold air being to modify the patterns of the crystallization and give the surface somewhat the appearance of flowers or leaves.

Having thus described my invention, what I claim, and desire to secure by Letters Patent, is—

1. In the ornamentation of sheet metal, the process of forming a colored crystallized surface thereon by coating the same with a mixture of water, muriatic acid, nitric acid, and bichromate of potash, and immediately thereafter cleaning the surface with clear water, then pouring muriatic acid over the whole surface and draining it off, and next again coating the surface with a solution of hyposulphite of soda and cleaning it, as before, with clear water, substantially as set forth.

2. In the ornamentation of sheet-tin, the process of forming a colored crystallized surface thereon by first heating the sheet metal until the tin begins to melt, then cooling it by sprinkling cold water or blowing cold air against the heated surface, and next coating the cooled surface with a mixture of water, muriatic acid, nitric acid, and bichromate of potash, cleaning the surface with clear water, pouring muriatic acid over the whole surface and draining it off, and again coating it with a solution of hyposulphite of soda and cleaning it, as before, with clear water, substantially as set forth.

In testimony that I claim the foregoing I have hereunto set my hand, at Milwaukee, in the county of Milwaukee and State of Wisconsin, in the presence of two witnesses.

JOHN KOEBEL.

Witnesses:
H. G. UNDERWOOD,
WILLIAM KLUG.